(12) United States Patent
Beaumont

(10) Patent No.: US 7,274,379 B2
(45) Date of Patent: *Sep. 25, 2007

(54) GRAPHICAL OBJECT GROUP MANAGEMENT SYSTEM

(75) Inventor: Ian Richard Beaumont, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 10/807,101

(22) Filed: Mar. 24, 2004

(65) Prior Publication Data

US 2004/0207651 A1 Oct. 21, 2004

(30) Foreign Application Priority Data

Mar. 27, 2003 (AU) .............................. 2003901416

(51) Int. Cl.
*G06T 1/00* (2006.01)
(52) U.S. Cl. ..................................... 345/630
(58) Field of Classification Search ................. 345/418
See application file for complete search history.

(56) References Cited

U.S. PATENT DOCUMENTS

| | | | | | |
|---|---|---|---|---|---|
| 4,737,980 | A | * | 4/1988 | Curtin et al. ............. | 379/93.18 |
| 4,965,742 | A | | 10/1990 | Skeirik ........................ | 364/513 |
| 5,600,768 | A | * | 2/1997 | Andresen ..................... | 345/629 |
| 5,608,907 | A | | 3/1997 | Fehskens et al. ........... | 395/672 |
| 6,072,506 | A | * | 6/2000 | Schneider .................... | 345/533 |

(Continued)

FOREIGN PATENT DOCUMENTS

JP 5-135025 6/1993

JP 2000-112693 4/2000

OTHER PUBLICATIONS

Copy of Japanese Office Action dated Nov. 27, 2006, in counterpart Application No. 2004-096967.
Copy of Japanese Office Action dated Feb. 26, 2007, in counterpart Application No. 2004-096967.

*Primary Examiner*—Mark Zimmerman
*Assistant Examiner*—Andrew Yang
(74) *Attorney, Agent, or Firm*—Fitzpatrick, Cella, Harper & Scinto

(57) ABSTRACT

A graphics rendering system (400) and method (500) are disclosed for forming object groups from input objects (431 through 438). The graphics rendering system (400) comprises an number of detection schemes (421 to 423), a managing module (410) and a rendering module (405). Each detection scheme (421 to 423) has a priority and an associated object group type, and is operative to detect whether an object forms part of an object group of the associated object group type. The managing module (410) passes data describing a received input object to at least one of the detection schemes (421 to 423), and receives notification from the detection scheme(s) whether the object forms part of the object group(s). The managing module (410) then determines whether one or more of the object groups are completely formed, where at least partly formed object groups form a list. A completely formed object group is passed by the managing module (410) to the rendering module (405) for rendering based on the priorities of the detection schemes associated with the object group types of the object groups in the set. The above avoids the need for complex inter-detection scheme communication through the management of graphic objects, detection schemes and their priorities.

14 Claims, 18 Drawing Sheets

U.S. PATENT DOCUMENTS

| | | | |
|---|---|---|---|
| 6,320,595 B1 * | 11/2001 | Simons et al. | 345/619 |
| 6,320,667 B1 | 11/2001 | Mitsuhashi | 358/1.1 |
| 6,343,309 B1 * | 1/2002 | Clarke et al. | 718/106 |
| 6,809,731 B2 * | 10/2004 | Muffler et al. | 345/428 |
| 7,145,578 B2 * | 12/2006 | Deng et al. | 345/630 |
| 2006/0103671 A1 * | 5/2006 | Brown | 345/629 |

* cited by examiner

GRAPHICAL OBJECT GROUP MANAGEMENT SYSTEM

FIELD OF THE INVENTION

The present invention relates generally to the management of objects in an object rendering system and, in particular, to the management of graphical object detection schemes within the object rendering system.

BACKGROUND

Rendering is the process by which graphics objects are converted to pixels. Graphics rendering systems typically use a painters algorithm style of rendering where each object is drawn onto a frame buffer as it arrives. Other graphics rendering systems use a 2-stage approach, where the graphics rendering system firstly converts all incoming objects into some intermediate format for the page, and the second stage renders a scanline at a time.

No matter the type of graphics rendering system, efficiency problems are suffered due to the nature of some of the graphic commands received from application programs. For example, a common drawing application program passes a gradient fill to the graphics rendering system as a group of adjacent overlapping rectangles, each with a slightly different flat colour, to give the impression of a smooth gradient fill. Although true to the nature of the original object, the graphic objects are abundant with redundant data.

In an attempt to reduce the above inefficiencies, it has been proposed to detect simple graphic objects that may be combined into more complex graphic objects, and combining such graphic objects into object groups, thereby removing redundant data and reducing the number of raster operations. An object group, in this context, is used to describe a group of one or more objects that may be combined to form a more efficient (set of) object(s) specific to the graphics rendering system. The combined object(s) may be more complex than the group of single objects, but the graphics rendering system may be able to handle the object group(s) more efficiently. Single objects may be classified as an object group if they can be transformed into a format more desirable to the graphics rendering system than the format in which they were originally represented.

Object group detection schemes are typically used for determining whether or not the objects can be grouped to form a more efficient/desirable set of objects. System designers specifically tailor detection schemes to detect and "correct" these object inefficiencies. The "corrected" graphic object data, although most likely more complex than the original, would be optimised for the specific graphics rendering system, causing the system which includes such a rendering system to be more efficient.

Each detection scheme detects and combines a different grouping of graphic objects to form a complex graphic object. Due to the fact that detection schemes often use one or more of the same objects, conflict amongst detection schemes would occur when the rendering system includes multiple detection schemes.

SUMMARY

It is an object of the present invention to substantially overcome, or at least ameliorate, one or more disadvantages of existing arrangements.

According to a first aspect of the present invention there is provided a method of forming object groups from a plurality of received objects, said method comprising for each received object the steps of:

passing data describing said received object to at least one detection scheme, each detection scheme having a priority and an associated object group type, and operative to detect whether said received object forms part of an object group of said associated object group type;

receiving notification from said at least one detection scheme of whether said received object forms part of said object group(s);

determining whether one or more of said object groups are completely formed, where at least partly formed object groups form a list; and outputting for rendering a completely formed object group based on said priorities.

According to a second aspect of the present invention there is provided a graphics rendering system for forming object groups from a plurality of received objects, said graphics rendering system comprising:

a plurality of detection schemes, each detection scheme having a priority and an associated object group type, and operative to detect whether an object forms part of an object group of said associated object group type;

a managing module for passing data describing a received object to at least one detection scheme, for receiving notification from said at least one detection scheme of whether said received object forms part of said object group(s), for determining whether one or more of said object groups are completely formed, where at least partly formed object groups form a list, and for passing a completely formed object group to a rendering module based on said priorities.

According to another aspect of the present invention there is provided a computer program product including a computer readable medium having recorded thereon a computer program for implementing the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
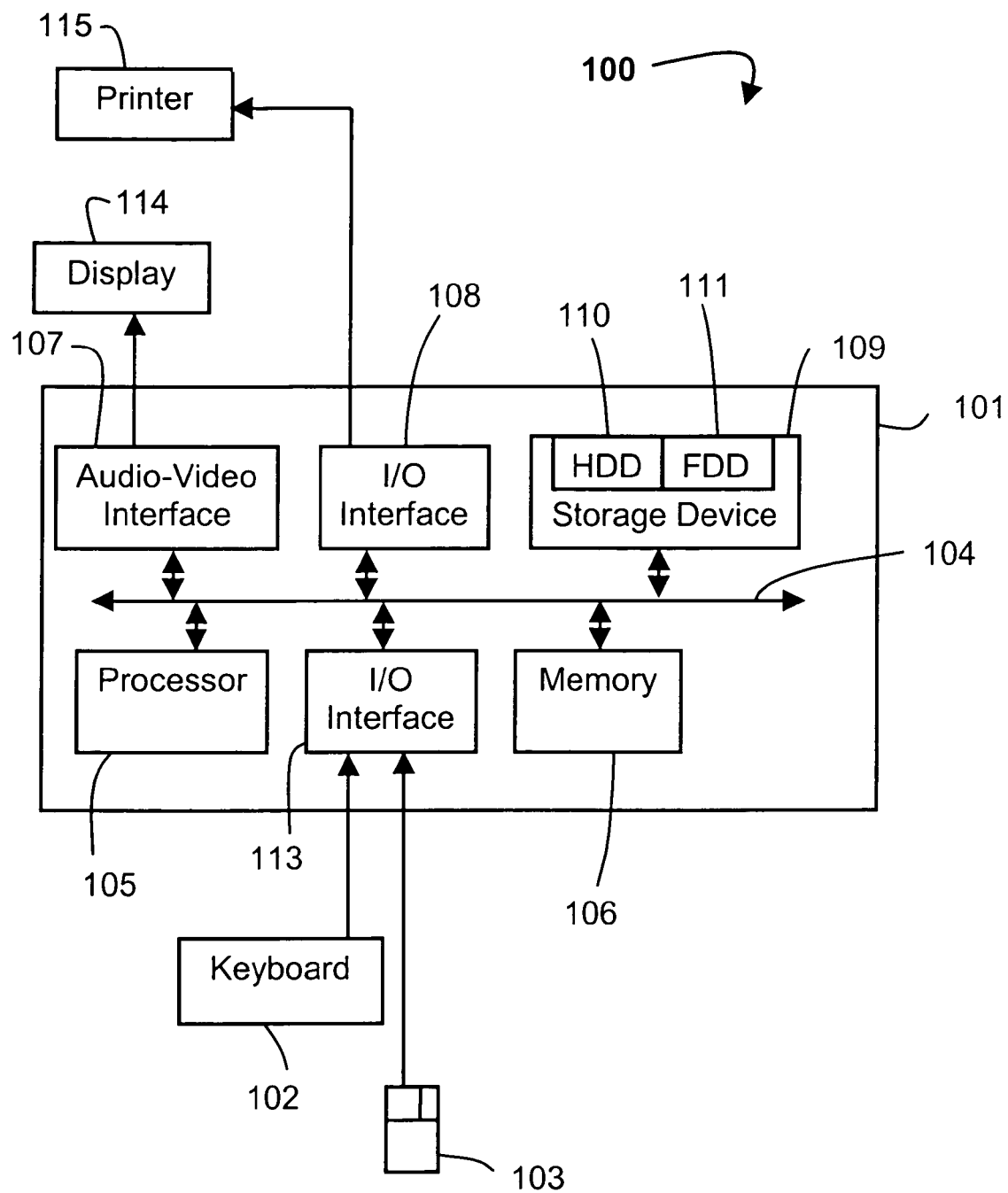
FIG. 1 illustrates a general-purpose computer system.

Where reference is made in any one or more of the accompanying drawings to steps and/or features, which have the same reference numerals, those steps and/or features have for the purposes of this description the same function(s) or operation(s), unless the contrary intention appears.

FIG. 1 illustrates a general-purpose computer system 100 that may be used for rendering objects to one or more output devices of the computer system 100, such as a display device 114 or a printing device 115. The computer system 100 is formed from a computer module 101, input devices such as a keyboard 102 and mouse 103, and output devices including the printer 115 and the display device 114.

The computer module 101 includes at least one processor unit 105, a memory unit 106, a storage device 109 which typically includes a hard disk drive 110 and a floppy disk drive 111, and a number of input/output (I/O) interfaces. The input/output (I/O) interfaces include a video interface 107 that couples to the video display 114, an I/O interface 113 for the keyboard 102 and mouse 103, and an interface 108 for the printer 115. The components 105 to 113 of the computer module 101 communicate via an interconnected bus 104. An operating system executing within the computer system 100 performs basic tasks, such as recognizing input from the keyboard 102 and mouse 103, sending output to the display screen 114 and printer 115, keeping track of files and directories on the storage device 109, and controlling the hard disk drive 110 and the floppy disk drive 111. The operating system also provides a software platform on top of which application programs can execute.

Figure 2:
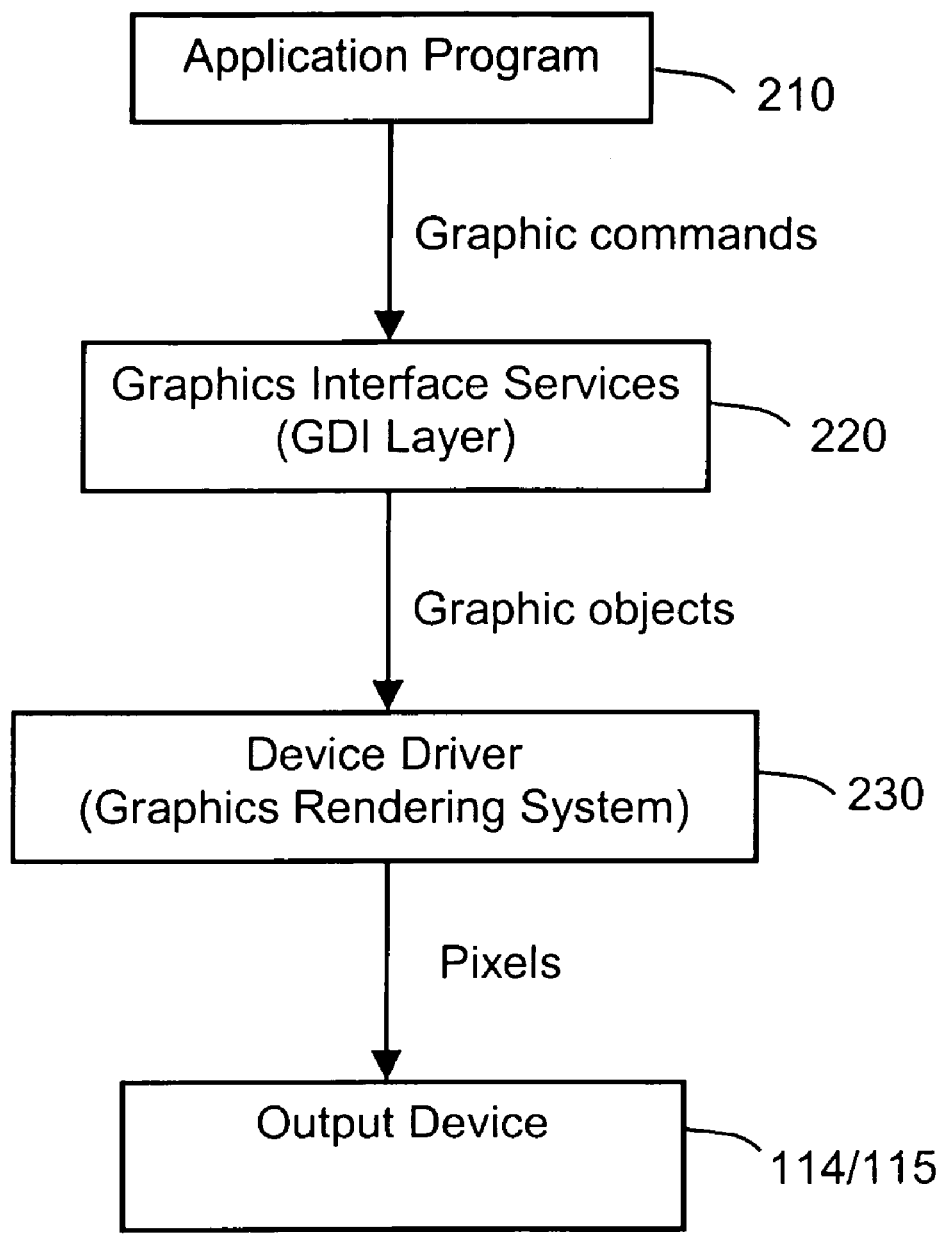
FIG. 2 illustrates modules of the computer system involved in rendering objects to output devices of the computer system.

FIG. 2 illustrates modules of the computer system 100 (FIG. 1) involved in a process of rendering objects to one of the output devices 114 or 115. An application program 210 executing within the processor 105, such as a word processor, creates page-based document data, where each page contains graphic objects. The graphic objects typically include text, lines, fill regions and image data.

When a document is to be rendered on the output device 114 or 115, the application program 210 passes each page of the document as a series of graphic commands to graphics interface services 220 provided by the native operating system of the computer system 100. The graphic commands describe the graphic objects of the page. The set of graphics interface services 220 is known as the graphics device interface (GDI) layer, and is generally an application programming interface providing a rich set of graphics functionality to all application programs.

The GDI layer 220 provides graphic objects to a device driver 230 in a format that the GDI layer 220 judges the device driver 230 would process most efficiently, and at a resolution of the output device 114 or 115. In fact, the GDI layer 220 mediates between the application program 210 and the output device 114 or 115, thereby enabling the device driver 230 to support a much smaller set of functionality, such as drawing rectangular blocks of image data, and filling simple regions with flat color.

The device driver 230, also known as a graphics rendering system, renders the graphics objects received from the GDI layer 220. Rendering is the process by which the graphics objects received from the GDI layer 220 are converted to pixels by the device driver 230. The pixels are sent to the output device 114 or 115. Whilst the application program 210 and the graphics interface services 220 are formed by software, the device driver 230 may be performed in software, hardware or a combination thereof.

In the preferred implementation, the process of rendering by the graphics rendering system 230 is effected by instructions in software that are carried out by the processor 105 of a general-purpose computer 100. The software may be stored in a computer readable medium, including the storage device 109, for example. A computer readable medium having such software or computer program recorded on it is a computer program product.

Figure 3:
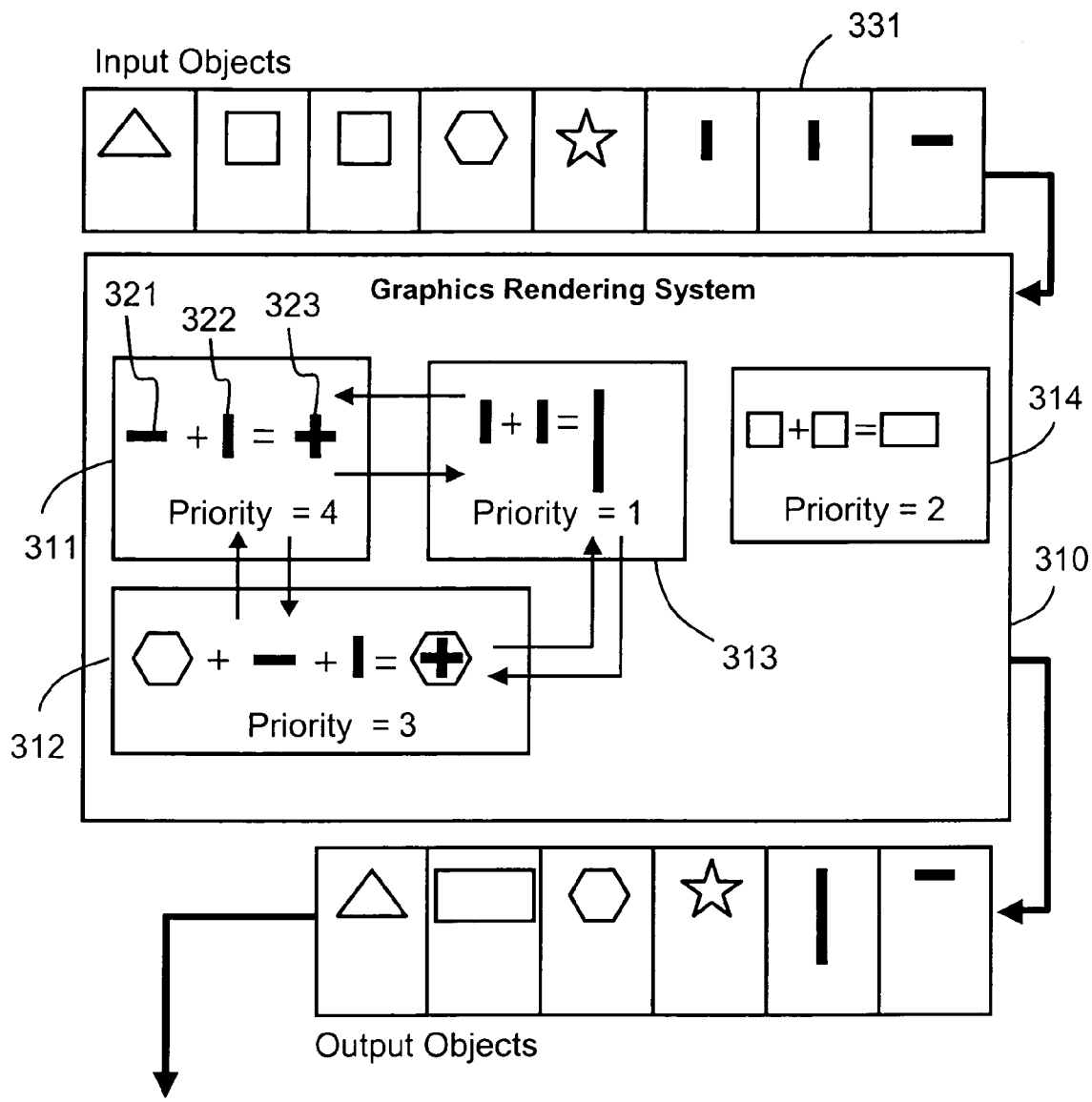
FIG. 3 shows a graphics rendering system that includes multiple detection schemes.

FIG. 3 shows a graphics rendering system 310 that includes four detection schemes 311 to 314. Each of the detection schemes 311 to 314 combines a different combination of simple graphic objects to form their respective complex graphic object. For example, detection scheme 311 combines a horizontal line 321 and a vertical line 322 to form a cross 323.

However, when input object 331 is received by the graphics rendering system 310, three of the detection schemes 311 to 313 detect object 331, which is a vertical line, as a simple object that may be used to form the respective complex graphic objects formed by those detection schemes 311 to 313. Since the detection schemes 311 to 313 share simple graphic objects, each scheme 311 to 313 has to communicate with every other scheme 311 to 314 that may share a common object to ensure that the object is only output once. Each detection scheme 311 to 314 needs to have a priority. Priority is the ranking given to an object group type. The lower the priority number assigned to a particular detection scheme 311 to 314, and hence the object group type detected by the particular detection scheme, the higher the priority. The detection scheme 311 to 314 having the highest priority gets all the objects it requires to form its object group type.

Without a priority base and complete detection scheme interaction it would almost be impossible to output the most efficient set of grouped graphic objects within a graphics rendering system 310, as individual detection schemes 311 to 314 could not use the same objects as any other detection scheme 311 to 314 within the graphics rendering system 310.

The above requirement that detection schemes 311 to 314 need to communicate with one another greatly reduces the ease at which new detection schemes may be implemented. As more detection schemes are added to the graphics rendering system 310, the communication protocols typically grow in complexity, which has the adverse effect of reducing execution speed and increasing code complexity within the graphics rendering system 310. Furthermore, without a proper base to introduce new detection schemes, the ease of implementing a new object group detection scheme is reduced, and software reusability suffers.

Figure 4:
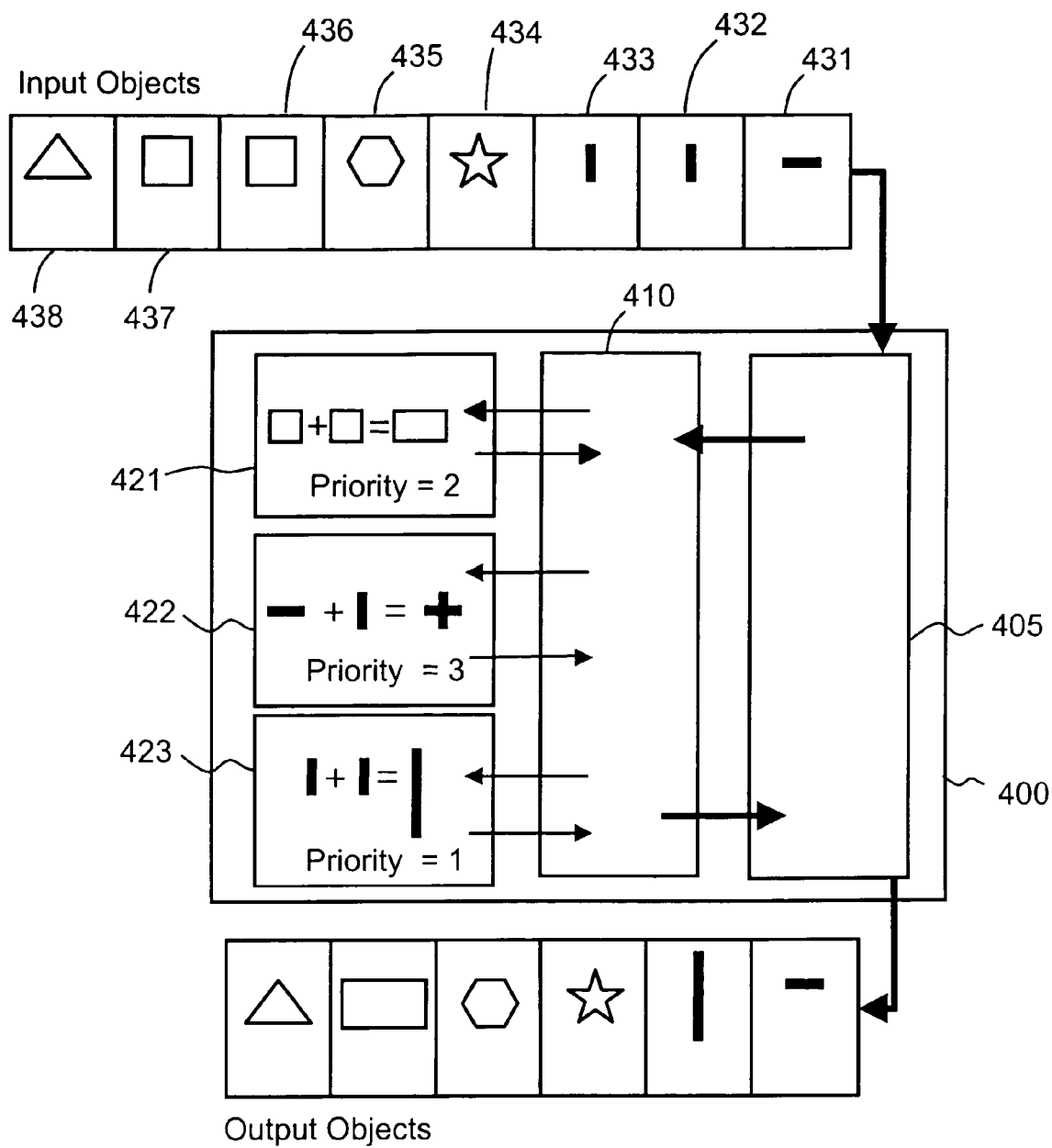
FIG. 4 illustrates a preferred implementation of a graphics rendering system according to the present disclosure.

FIG. 4 illustrates a preferred implementation of a graphics rendering system 400 according to the present disclosure. The graphics rendering system 400 includes a rendering module 405, an object group managing module 410 and a number of detection schemes 421 to 423, all of which are preferably effected by instructions executed by the processor 105.

The purpose of the detection schemes 421 to 423 is to increase the "desirability" of the graphic objects received from the GDI layer 220 (FIG. 2) by grouping graphic objects into object groups, thereby allowing the rendering module 405 to more efficiently convert the graphic objects to pixels. Desirability amongst different rendering modules 405 may differ in that some rendering modules 405 prefer objects that are compact, while other rendering modules 405 prefer a set of more simplistic objects. Each detection scheme 421 to 423 "recognises" those graphic objects needed to form one particular object group. Therefore, each detection scheme 421 to 423 stores a certain number of objects needed to form its particular object group.

As is often the case, detection schemes 421 to 423, and in particular detection schemes 422 and 423, use the same graphic object(s) to form their respective object groups. These two object groups are said to be overlapping. The object group managing module 410 passes each object received by the graphics rendering system 400 to individual detection schemes that are associated with the current object type and stores the response about the success/failure of a detected object group. Each object type has a predefined association to 0 or more detection schemes. The object group managing module 410 uses the results from the individual detection schemes 421 to 423 to manage, and control the output of, currently active object groups (held by the individual detection schemes), which may include grouped objects and single objects.

In order to do so, the object group managing module 410 mediates between the detection schemes 421 to 423 that have overlapping objects to decide which object group is assigned which objects. The object group managing module 410 effectively acts as a communicator and organiser between the detection schemes 421 to 423 and the rendering module 405, reducing the need for the separate detection schemes 421 to 423 to communicate with one another.

The object group managing module 410 also handles the outputting of objects that do not belong to any of the object groups formed by the respective detection schemes 421 to 423 and also handles the outputting any objects that may have belonged to an object group but the object group failed to complete. The object group managing module 410 in this sense acts as a manager to control and organise individual detection schemes 421 to 423, as well as controlling the flow of objects into and out of the graphics rendering system 400.

It is noted that detection scheme 423 has been assigned the highest priority, followed by detection scheme 421. In this example, because detection schemes 422 and 423 are overlapping, detection scheme 423 forms its object group in preference to detection scheme 422.

In the following, the rendering module 405, upon initialisation, sends configuration data to the object group managing module 410. The configuration data typically includes the priorities of the detection schemes 421 to 423 implemented in the graphics rendering system 400, a list of callback functions, and a list of configuration data for each of the specific detection schemes 421 to 423. Configuration data is used to set specific limits on how each detection scheme 421 to 423 decides whether an object group is formed. In particular, an 'Always Formed' flag is either set or not set. When set, this flag indicates that an object group can be completed by any number (greater than equal to one) of objects. Such an object group can therefore be treated as a completed group for output purposes even if a higher priority object group has some objects in common with it, as will be explained later. The callback functions are used to call the detection schemes 421 to 423.

There are two callback functions associated with each detection scheme 421 to 423 namely a recognise callback function and a flush callback function. In response to a recognise callback function the detection scheme 421 to 423 reports on the detection status of an object group to the object group managing module 410 by sending back a status flag which may have one of the following meanings:

object group complete (including the current object);
object group complete (not including the current object) and current object has been accepted into a new group;
object group complete (not including the current object) and current object has not been accepted into a new group;
new object group started and complete, by the current object;
object group still forming ("detected");
object group failed (including the current object);
object group failed (not including the current object) and current object is not accepted into a new object group;
object group failed (not including the current object) and current object is accepted in a new object group;
object not accepted; and
new object group started ("positive" status).

The flush callback function causes the detection scheme 421 to 423 to output a complete object group or a single object.

In operation, the rendering module 405 receives graphic objects 431 to 438 from the GDI layer 220 (FIG. 2), one by one. The objects 431 to 438 are passed by the rendering module 405 to the object group managing module 410. In particular, the rendering module 405 provides the object group managing module 410 with object group types that the particular object may belong to, the number of these object types and the object itself. The object is wrapped in a structure such that the header of the structure contains the object group types of the object and the number of such types. The object is also saved by the rendering module 405 in memory 106 (FIG. 1).

Figure 5A:
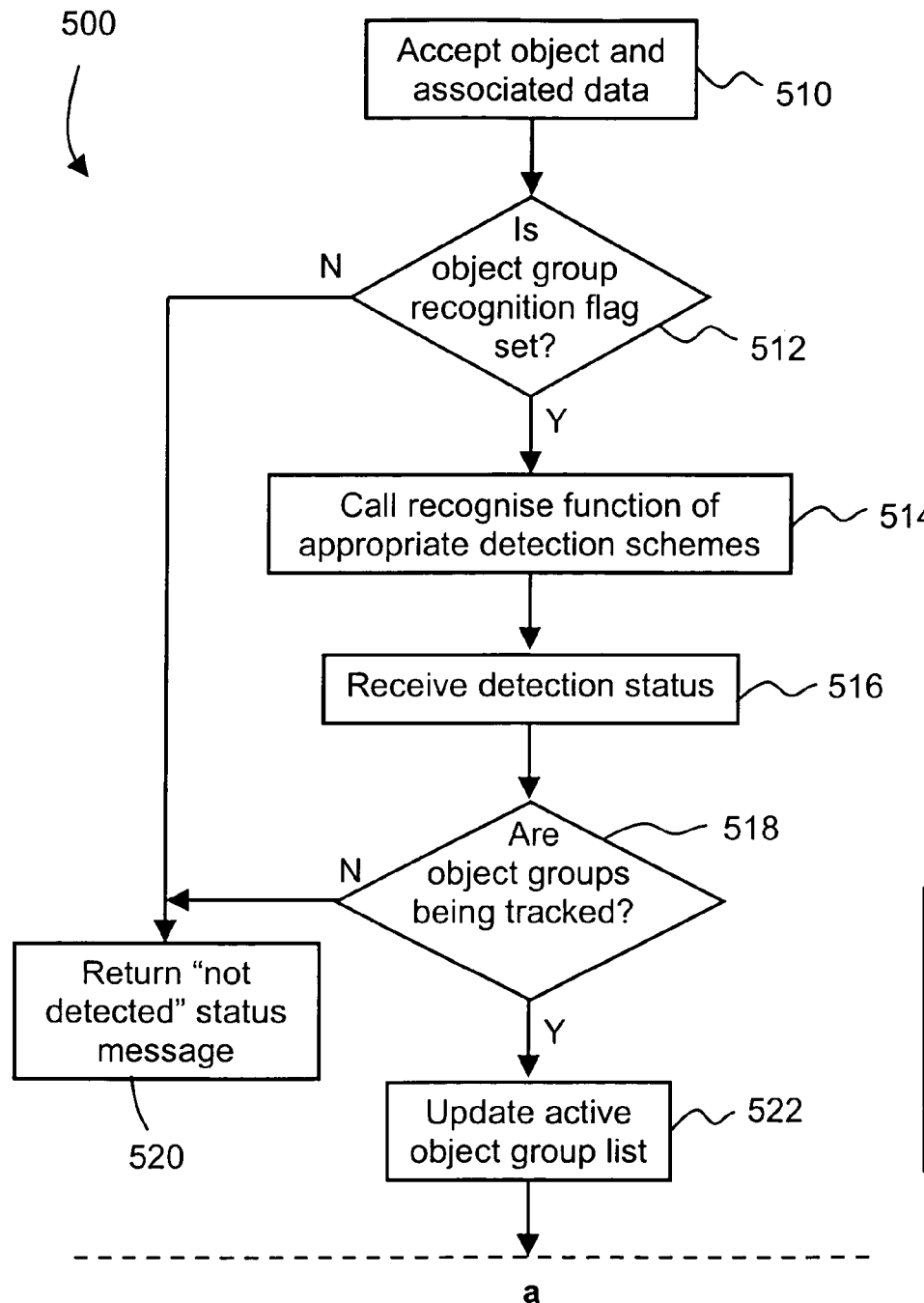
FIG. 5 is a flow diagram of a process performed by the object group managing module.
Figure 5B:
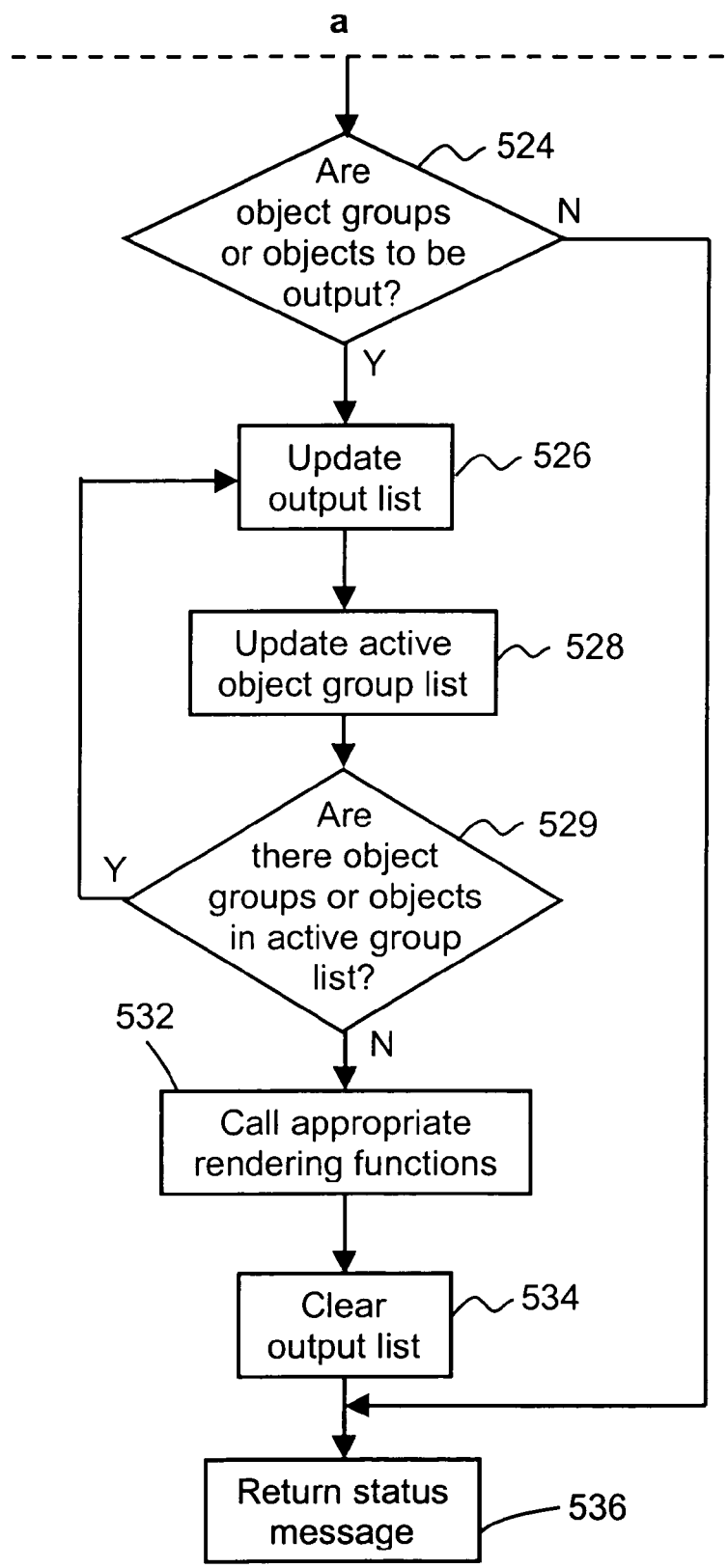

FIG. 5 is a flow diagram of a process 500 performed by the object group managing module 410. The steps of the process 500 are effected by software loaded into memory 106 and executed by the processor 105. The object group managing module 410 starts process 500 in step 510 where the object group managing module 410 accepts the object and associated data from the rendering module 405 and stores it in an object list. The object group managing module 410 also saves a pointer to the object in memory 106.

Step 512 follows where the object group managing module 410 determines whether an object group recognition flag is set. The object group recognition flag controls the on/off status of the object group managing module 410. If the object group recognition flag is not set, then the object group managing module 410 returns in step 520 control to the rendering module 405 by passing a "not detected" status message to the rendering module 405. The rendering module 405 then renders the object in the normal manner.

Alternatively, if the object group managing module 410 determines that the object group recognition flag is set, then the object group managing module 410 calls in step 514 a recognise function of each of the detection schemes 421 to 423 associated with the received object. If there are any object groups currently being tracked, i.e. the detection scheme has an active status in an active object group list, then the recognise function of those active detection schemes is also called. The active object group list is a list of the currently active object groups that the object group managing module 410 is currently tracking. Each item in the list includes the type of the object group, the priority of the object group, the objects over which the object group is active, and the status of the object group. The status may be "active", "complete", or "failed", although any item in the list with a "failed" flag is immediately removed.

Each detection scheme 421 to 423 determines whether the received graphic object is one of the objects that may be grouped with previously received objects, if any, to form a more complex graphic object and sends a response to the object group managing module 410 accordingly. The object group managing module 410 thus receives in step 516 a detection status from the detection schemes 421 to 423.

In step 518 the object group managing module 410 determines whether there are any object groups currently being tracked by determining whether there are currently object groups with "active" status in the active object group list or whether any of the detection schemes 421 to 423 returned a positive detection status in step 516. If no objects are currently being tracked, then process 500 proceeds to step 520 where a "not detected" status message is sent to the rendering module 405. It has thus been determined that the single graphics object does not belong to any object group type, and the object may be rendered in the usual manner by the rendering module 405 to avoid the object wasting memory space.

If the object group managing module 410 determines in step 518 that there is currently at least one object group with "active" status in the active object group list, or that at least one of the detection schemes 421 to 423 returned a positive detection status, then the object group managing module 410 updates the active object group list in step 522. This includes creating an entry with "active" status for each object group where the respective detection scheme 421 to 423 returned a "positive" detection status, amending the object lists of existing entries to include the current object where the respective detection scheme 421 to 423 returned a 'detected' detection status, and removing any object groups that fail to correctly form where the respective detection scheme returned any one of the object group failed detection statuses. A detection scheme will return one of the object group failed status flags when it receives an object that does not fit into the object group that it is designed to track. Step 522 also includes setting the status to 'complete' for each object group in the active object group list, where the corresponding detection scheme 421 to 423 returned any form of 'complete' detection status.

Process 500 then continues to step 524 where the object group managing module 410 determines whether any object groups or separate objects are to be output at this stage. Object groups or single objects are output if the highest priority object group in the active object group list has a status of "complete".

If the object group managing module 410 determines that an object group or single object(s) is to be output, then process 500 continues to step 526. Alternatively process 500 continues to step 536.

In step 526 the object group managing module 410 transfers the data of the highest priority object group in the active object group list that has a status of "complete" from the active object group list to an output list. An output list is a list of object groups and single objects that are to be output. The output list includes the type of object group to output, the range of objects to output, and whether to output an object group or single objects.

Step 528 follows where the object group managing module 410 updates the active object group list to reflect the fact that an object group or object has been removed from the list. This involves traversing the entries in the active object group list in descending priority order to locate object groups that had overlaps into the object group that was transferred in step 526. The 'Always Formed' flag of the corresponding detection scheme to each such object group is checked. If it is set, pointers to any objects that have already been placed in the output list are removed from the object list of that entry. If the flag is not set, any that object group is removed from the active object group list.

From step 528 the process 500 the continues to step 529 where the object group managing module 410 determines whether there are any further object groups or single objects in the active object group list that need to be transferred to the output list. It should be noted that once the object group managing module 410 determines that an object group or single object is to be output, then all the objects that it is currently tracking will need to be output, except the current object, on condition that it has been accepted into a new object group and not into any other object group. This ensures that the order of objects is preserved when rendering. If the object group managing module 410 determines in step 529 that more objects need to be transferred to the output list, then process 500 returns to step 526. Alternatively process 500 continues to step 532.

Thus, in the event that the object group managing module 410 determines that there are no more object groups and single object(s) to be transferred from the active object group list to the output list, then in step 532 the object group managing module 410 calls the appropriate rendering functions (via the flush callback function provided as part of a detection scheme) in the rendering module 405 according to the output list. To preserve the order in which objects came into the graphics rendering system 400, the output list is worked from the last object/object group in the list to the first. By calling the rendering functions the corresponding objects or object groups are rendered to the output device 114 or 115. Once the output list has been processed completely, the object group managing module 410 clears the object list in step 534.

The object group managing module 410 next in step 536 notifies the rendering module 405 that the received object has been processed. Even if there were no objects rendered because the output list was empty, this notification is sent meaning that the latest received graphics object was incorporated into an object group or partly formed object group. The process 500 is again performed upon receipt of a next object.

The operation of the graphics rendering system 400, and in particular the object group managing module 410, will now be illustrated by way of an example with reference to FIGS. 6A to 6G. In the example, the graphics rendering system 400 receives text objects from the GDI layer 220, renders the text objects, and outputs pixels to the display 114.

The graphics rendering system 400 of the example includes 2 detection schemes (not illustrated). The first detection scheme detects the text objects making up the object group "The" and outputs pixels to form the word "THE". The second detection scheme detects the text objects making up the object group "These", and outputs pixels to form the word "THESE". In the example the object group "These" is given the higher priority. Furthermore, neither detection scheme has its 'Always Formed' flag set. The text objects received by the rendering module 405 of the graphics rendering system 400 forms the word "These", having a space character following the second "e" character. The text objects are passed one by one to the object group managing module 410, each object being accompanied by its object group types.

Figure 6A:
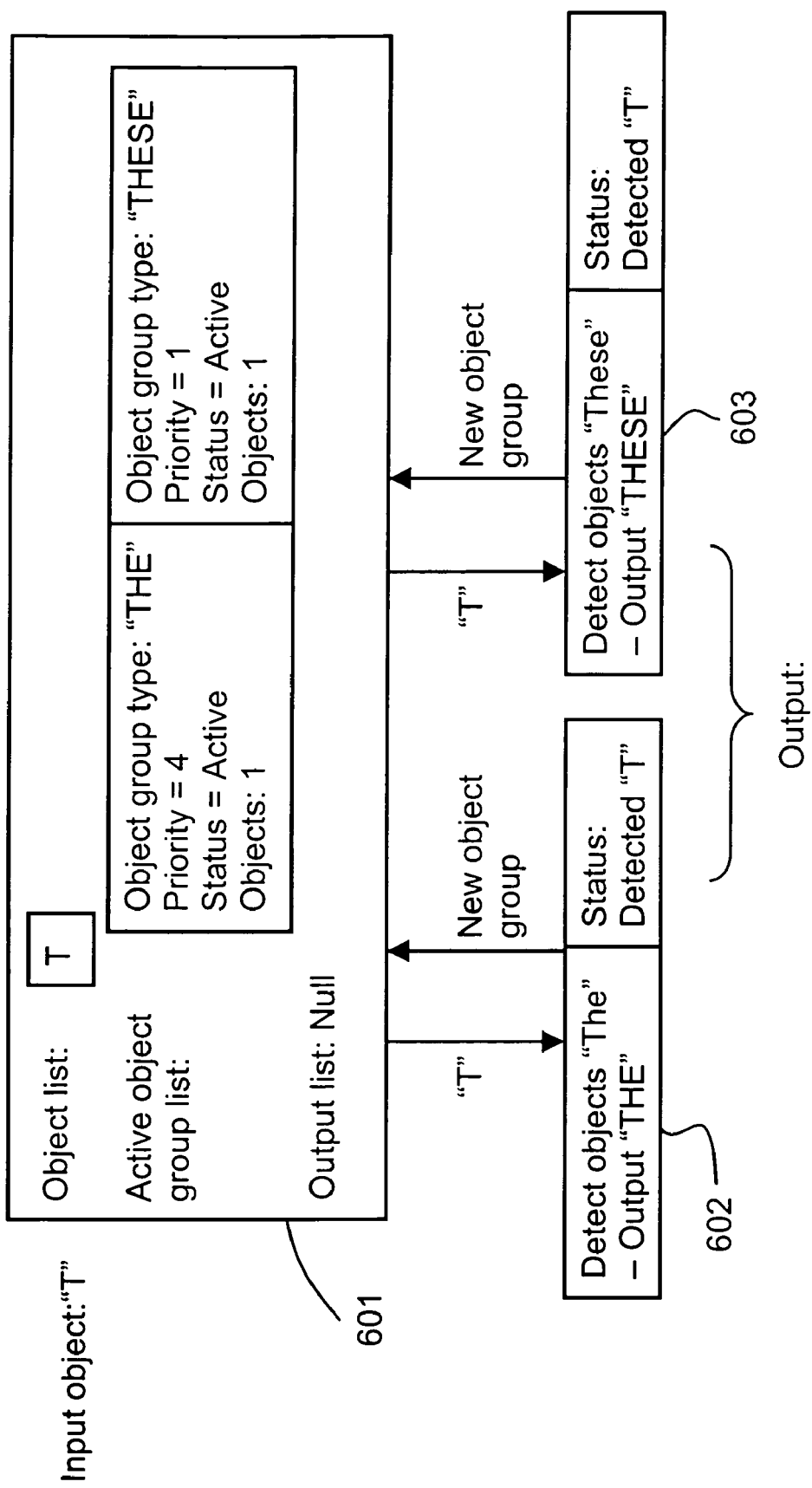
FIGS. 6A to 6G illustrate the operation of the graphics rendering system by way of an example.

Referring now to FIG. 6A where a first state 601 of the object group managing module 410 is illustrated. The object group managing module 410 first accepts the object "T" from the rendering module 405 and stores that object in an object list, which now contains one object "T". The object group managing module 410 calls the recognise function of each of the detection schemes associated with the received object "T".

Each detection scheme then determines whether the received graphic object is one of the objects that may be grouped to form its more complex graphic object and sends a detection status to the object group managing module 410 accordingly. FIG. 6A illustrates the states 602 and 603 of the 2 respective detection schemes. Each of the detection schemes recognised the object "T" and returned a "new object group started" status to the object group managing module 410. This tells the object group managing module 410 that the object passed to the detection schemes may be accepted as part of an object group in the future.

After receiving the "new object group started" status, the object group managing module 410 determines that there are now two active object groups currently being tracked by determining that two detection schemes returned a positive detection status. The object group managing module 410 adds the information received from the detection schemes to the (currently empty) active object group list by creating 2 new entries with "active" status, one associated with each detection scheme. The state 601 of the object group managing module 401 also shows the updated active object group list.

As the highest priority object group currently in the active object group list, which is the object group type "THESE" in the example, does not have a status of "complete", no objects are to be output at this stage.

The object group managing module 410 next notifies the rendering module 405 that the received object has been processed and that the object does not need to be output for rendering at this point in time.

Figure 6B:
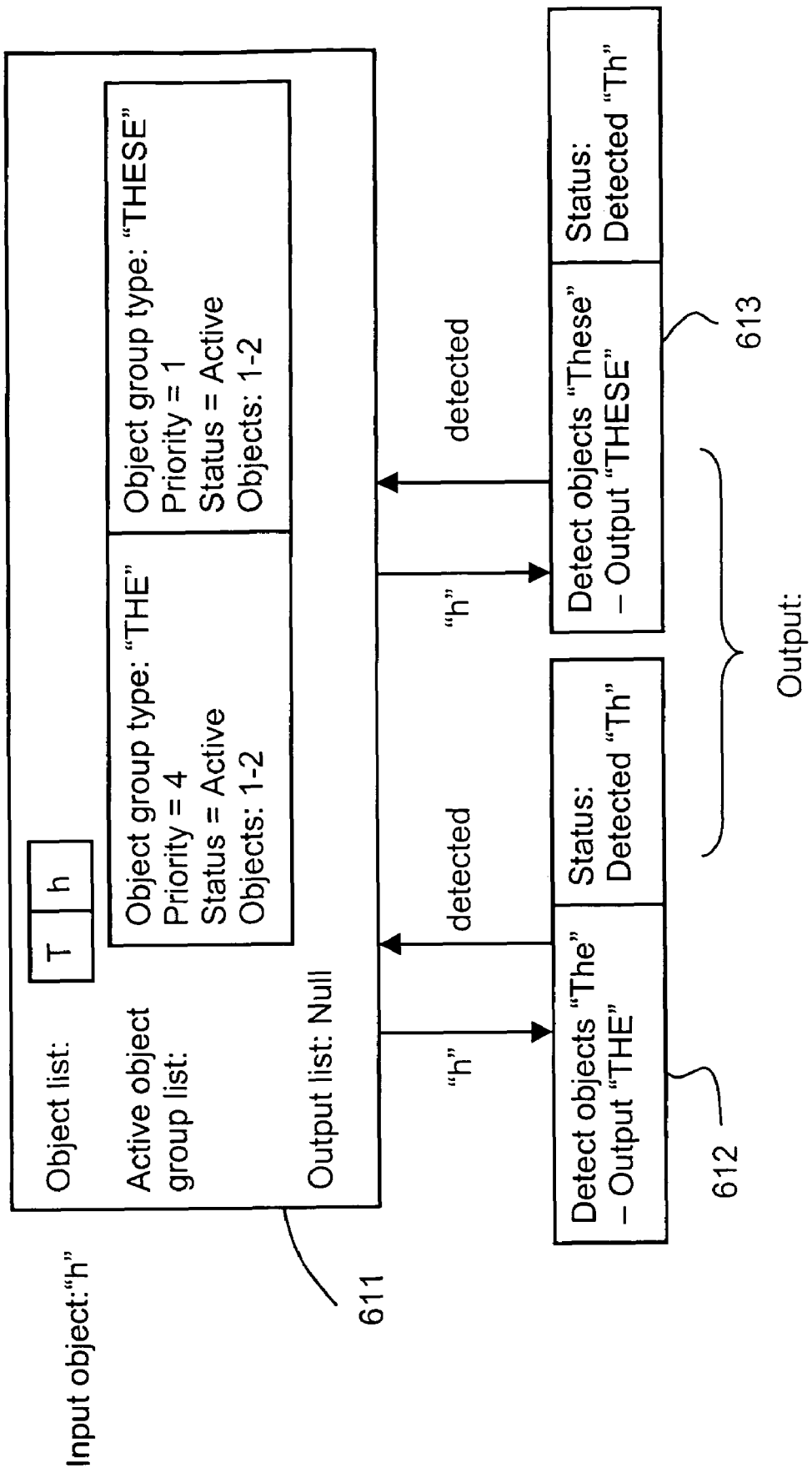

FIG. 6B illustrates a following state where the object group managing module 410 accepts the object "h" as a second object from the rendering module 405 and stores that object in the object list shown in the state 611 of the object group managing module 410. The object group managing module 410 then calls the recognise function of each of the detection schemes. This is not only because both detection schemes are associated with the object "h", but also because the object group types of both the detection schemes are in the active object group list. Note that each detection scheme is called back at most once per object.

As is illustrated in detection scheme states 612 and 613, each detection scheme determines that the received graphic object "h" is one of the objects that may be grouped with the object "T" to form its more complex graphic object. Accordingly, each detection scheme sends a "detected" detection status to the object group managing module 410. It is noted that the detection schemes would not have returned the "detected" detection status if they had not detected the object "T" as the previous object. A detection scheme could be adapted to handle out of order contiguous objects, but the module need not function any differently.

The object group managing module 410 updates the entries in the active object group list with the information received from the detection schemes. The state 611 of the object group managing module 401 shows that both object group types have an "active" status, and are associated with objects 1 and 2, which are "T" and "h" respectively.

It is still the case that the highest priority object group in the active object group list does not have a status of "complete", and no objects are to be output at this stage. The object group managing module 410 notifies the rendering module 405 that the received object has been processed.

The object group managing module 410 next accepts the object "e" from the rendering module 405, stores that object in the object list, and calls the recognise function of each of the detection schemes associated with the received object "e" and all the detection schemes associated with the object group types in the active graphic object list, which are both detection schemes in the example.

Figure 6C:
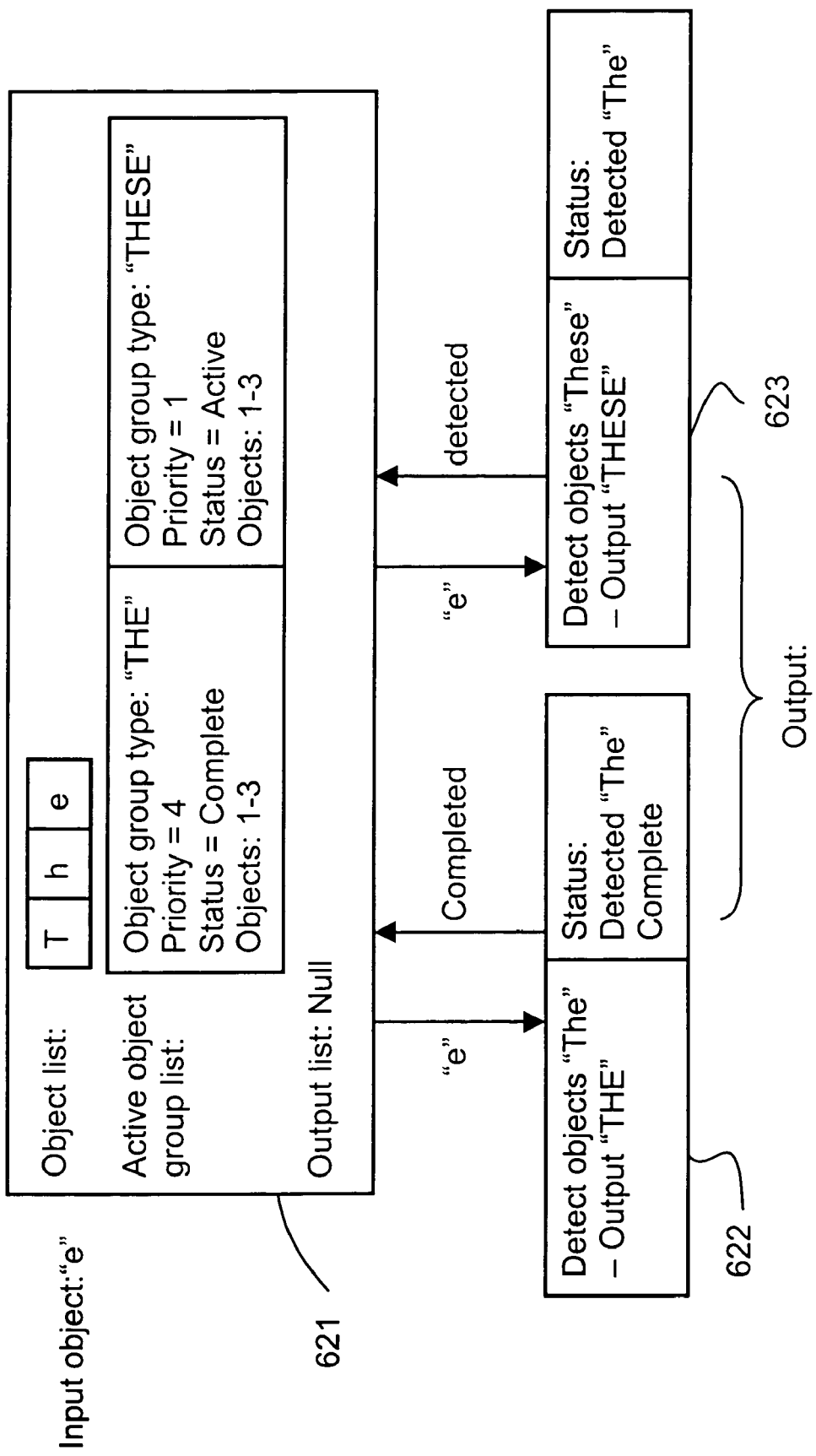

Both detection schemes determine that the object "e" is one of the objects that may be grouped to form their respective object groups. However, the detection scheme detecting the text objects making up the object group "The" determines that all the objects needed to form its object group have been received, and returns a status of "complete" to the object group managing module 410. FIG. 6C illustrates the states 622 and 623 of the detection schemes.

The object group managing module 410 adds the information received from the detection schemes to the active object group list by updating the existing 2 entries. The state 621 of the object group managing module 401 shows that object group type "THE" now has a "complete" status.

It is still the case that the highest priority object group in the active object group list does not have a status of "complete", and no objects are to be output at this stage. The object group managing module 410 notifies the rendering module 405 that the received object has been processed.

Figure 6D:
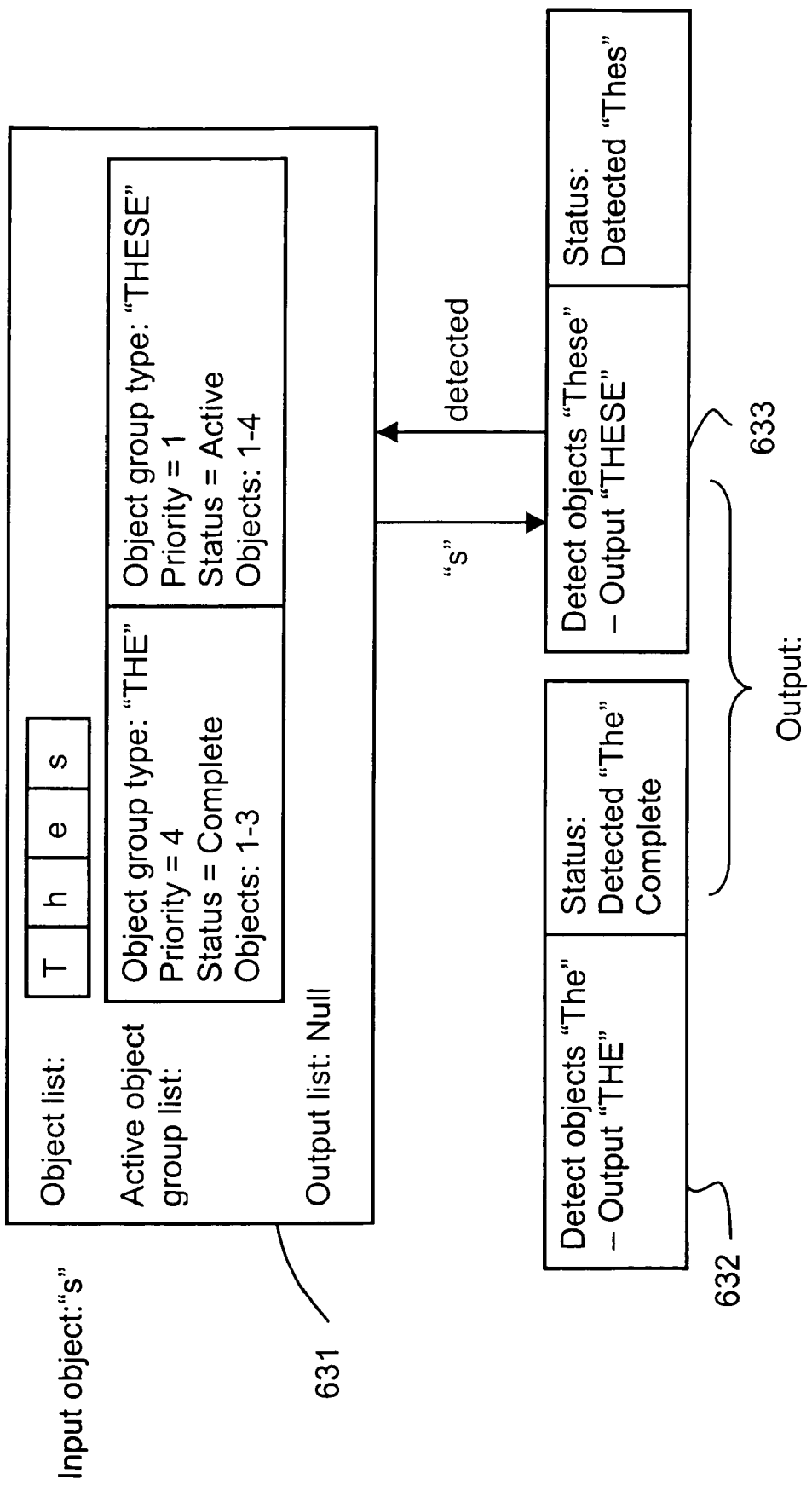

Referring now to FIG. 6D, the object group managing module 410 next accepts the object "s" from the rendering module 405, and stores that object in the object list. The object group managing module 410 then calls the recognise function of the detection scheme associated with object group type "THESE" only. This is because the detection scheme associated with object group type "THE" is not associated with the received object "s", and also because that detection scheme is not associated with an active-object group type in the active graphic object list. The object group type "THE" has a "complete" status.

The detection scheme associated with object group type "THESE" determines that the object "s" is one of the objects that may be grouped to form its object group and again returns a "detected" detection status to the object group managing module 410. FIG. 6D also illustrates the states 632 and 633 of the detection schemes. The object group managing module 410 adds the information received to the active object group list by updating the entry of object group type "THESE". The state 631 of the object group managing module 410 shows that object group type "THESE" still has an "active" status and is associated with objects 1 to 4. The entry of the completed object group type "THE" remains unchanged.

It is still the case that the highest priority object group in the active object group list does not have a status of "complete", and no objects are to be output at this stage. The object group managing module 410 notifies the rendering module 405 that the received object has been processed.

Figure 6E:
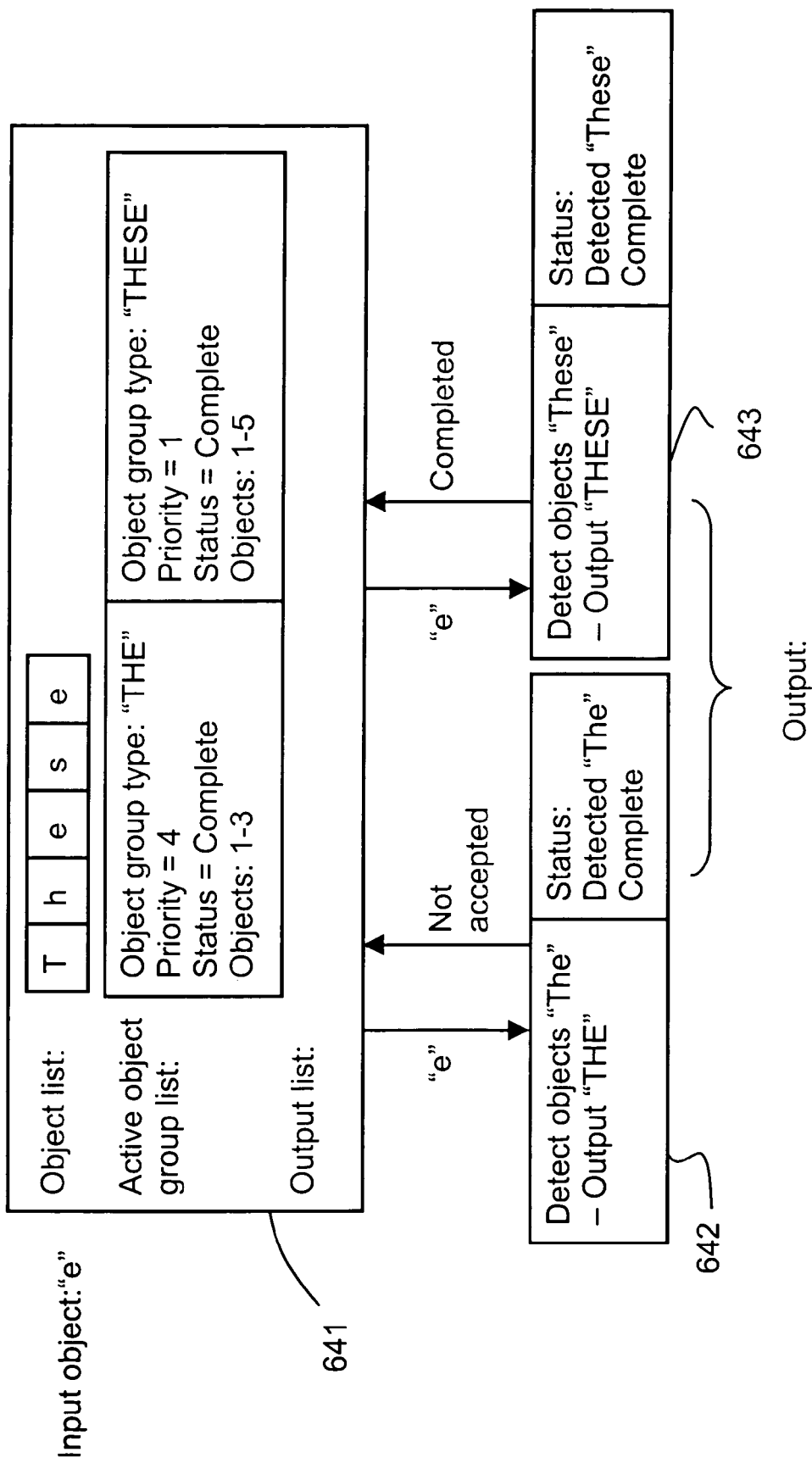

The example follows in FIG. 6E where the object group managing module 410 accepts the object "e" from the rendering module 405, and stores that object in the object list as object 5. The object group managing module 410 then calls the recognise function of both the detection schemes because the object "e" is associated with both object group types.

The detection scheme associated with object group type "THESE" determines that the object "e" is one of the objects that may be grouped with the previously received objects to form its object group and returns a "complete" detection status to the object group managing module 410.

The detection scheme associated with object group type "THE" does not recognise the object "e" as one of the objects that may be grouped with the previously received objects because the preceding object was not the object "h", and returns a "not accepted" detection status to the object group managing module 410. FIG. 6E also illustrates the states 642 and 643 of the detection schemes.

The object group managing module 410 adds the information received to the active object group list by updating the entry of object group type "THESE". The state 641 of the object group managing module 401 shows that object group type "THESE" now has a "complete" status and is associated with objects 1 to 5. The entry of the completed object group type "THE" remains unchanged.

Figure 6F:
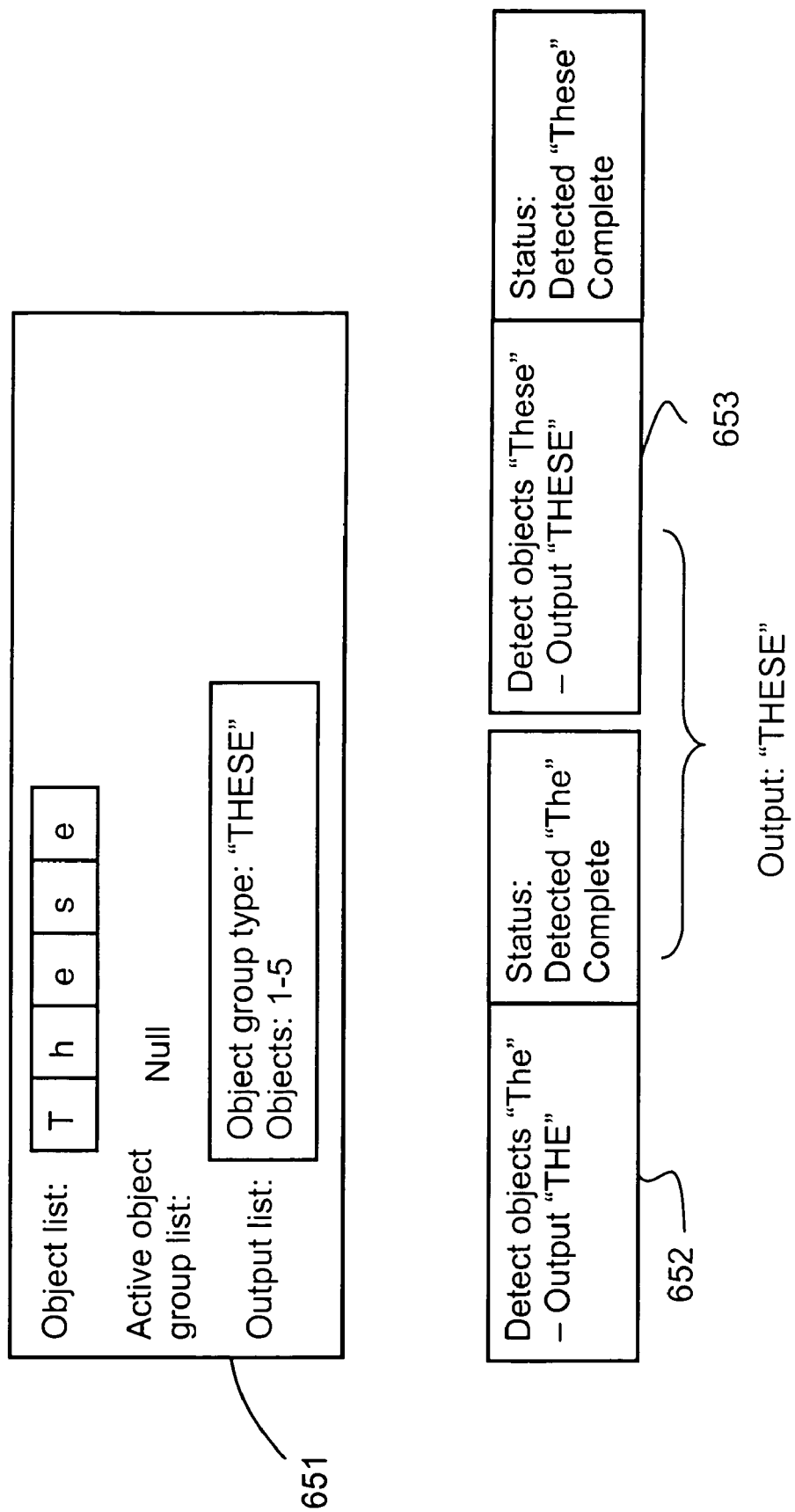

The object group managing module 410 now determines that the highest priority object group type in the active object group list has a status of "complete" and that object groups or separate objects are to be output at this stage. In order to do so, and as is illustrated in FIG. 6F, the object group managing module 410 transfers the data of the object group type "THESE" from the active object group list to the output list. The object group managing module 410 also updates the active object group list to reflect the fact that the object group type "THESE" has been removed from the list, and removes the object group type "THE" from the active object group list because it overlapped with the object group type "THESE" that was placed into the output list, and therefore acquired "failed" status.

The object group managing module 410 next determines that the active object group list is now empty, and that there are no more object groups or single objects to be output. The example follows where the object group managing module 410 calls the appropriate rendering functions in the rendering module 405 according to the output list. There is only one object group in the output list. By calling the rendering function of the object group type "THESE", pixels to form the word "THESE" are rendered to the output device 114 or 115. The object group managing module 410, which now has no objects that it is tracking, and accordingly no object group types in its active object group list, notifies the rendering module 405 that the received object has been processed.

Figure 6G:
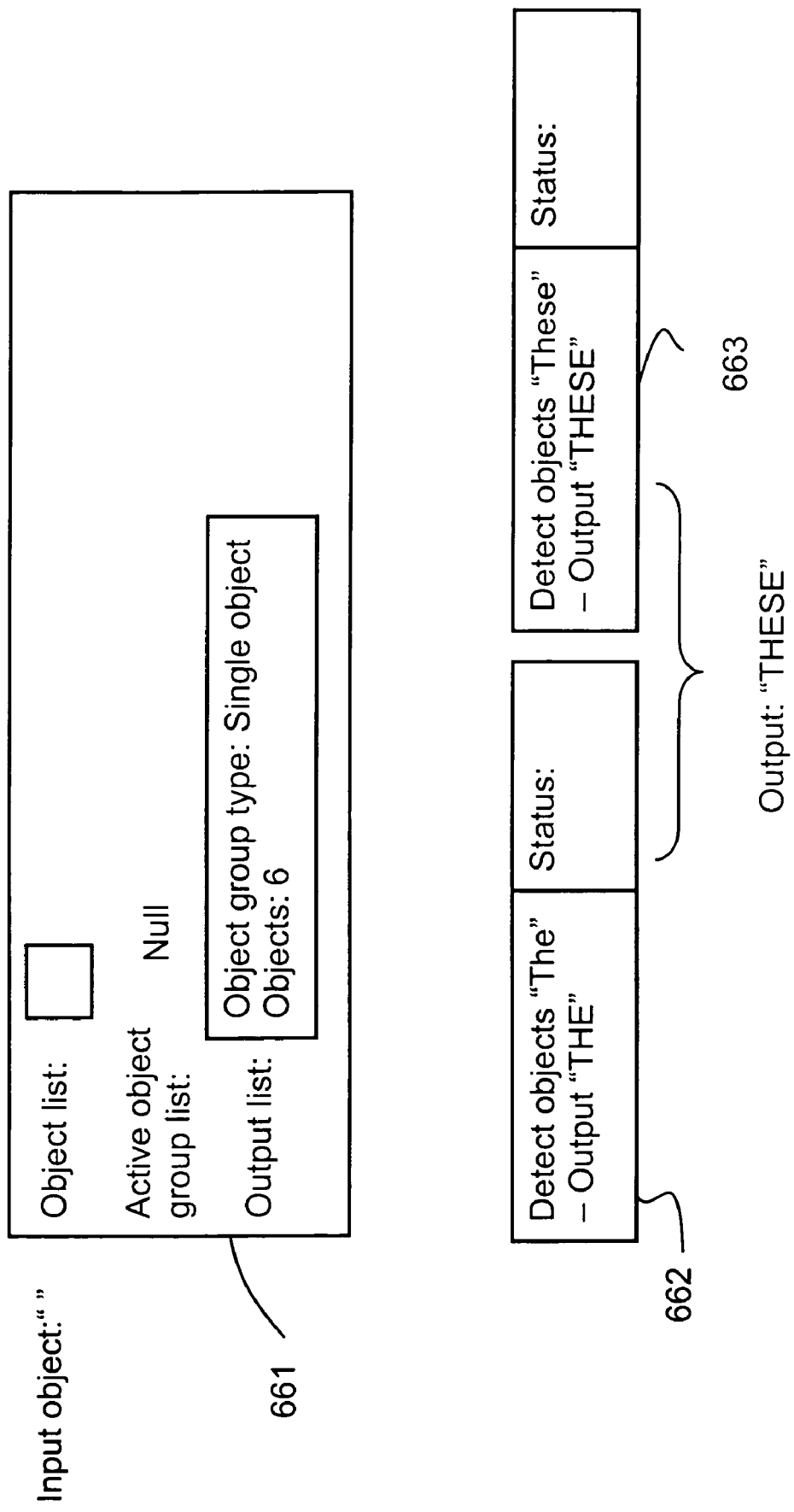

Finally the object group managing module 410 accepts the object " " (space character) from the rendering module 405, and stores that object in the object list shown in state 661 of FIG. 6G. Because the object " " is not associated with any of the detection schemes, no detection scheme is called.

Next, because the active object group list is empty, the object group managing module 410 sends a "not detected" status message to the rendering module 405. The rendering module 405 then renders the single object group type object " " in the normal manner. This concludes the example illustrated through FIGS. 6A to 6G.

Figure 7A:
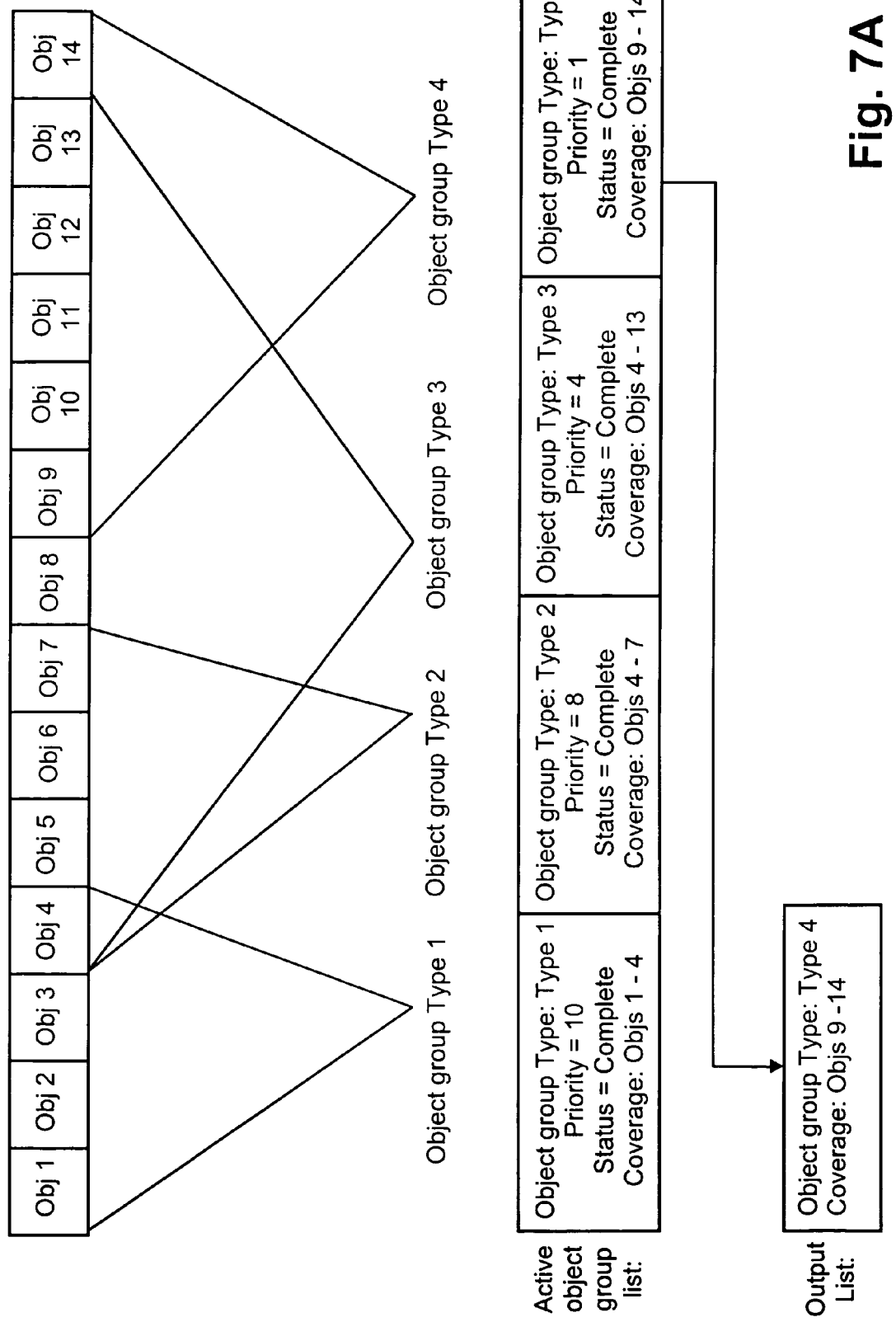
FIGS. 7A to 7E illustrate the transfer of data from an active object group list to an output list by way of an example.

The transfer of data by the object group managing module 410 from the active object group list to the output list occurring in step 526 (FIG. 5) will now be described in more detail by means of another example. FIG. 7A graphically illustrates 14 objects and the active object group types associated with them. Also shown is the active object group list including 4 object group types, all of which having a status of complete. Note also that the detection scheme associated with object group type 1 has its 'Always Formed' flag set. Without going through the sequence of steps that created the active object group list, it is noted that as each respective object group type became complete, that there was another active object group type having a higher priority preventing objects and object groups to be output.

However, at the current stage of the example, object group type 4 having the highest priority of the object group types in the active object group list has a "complete" status. Hence, the data of object group type 4, which spans objects 9 to 14, is transferred to the output list which is also shown.

If there is more than one complete object group with the same priority (which will mean that the object group types are the same), then the object group that is based on the later object grouping will be transferred to the output list first.

Figure 7B:
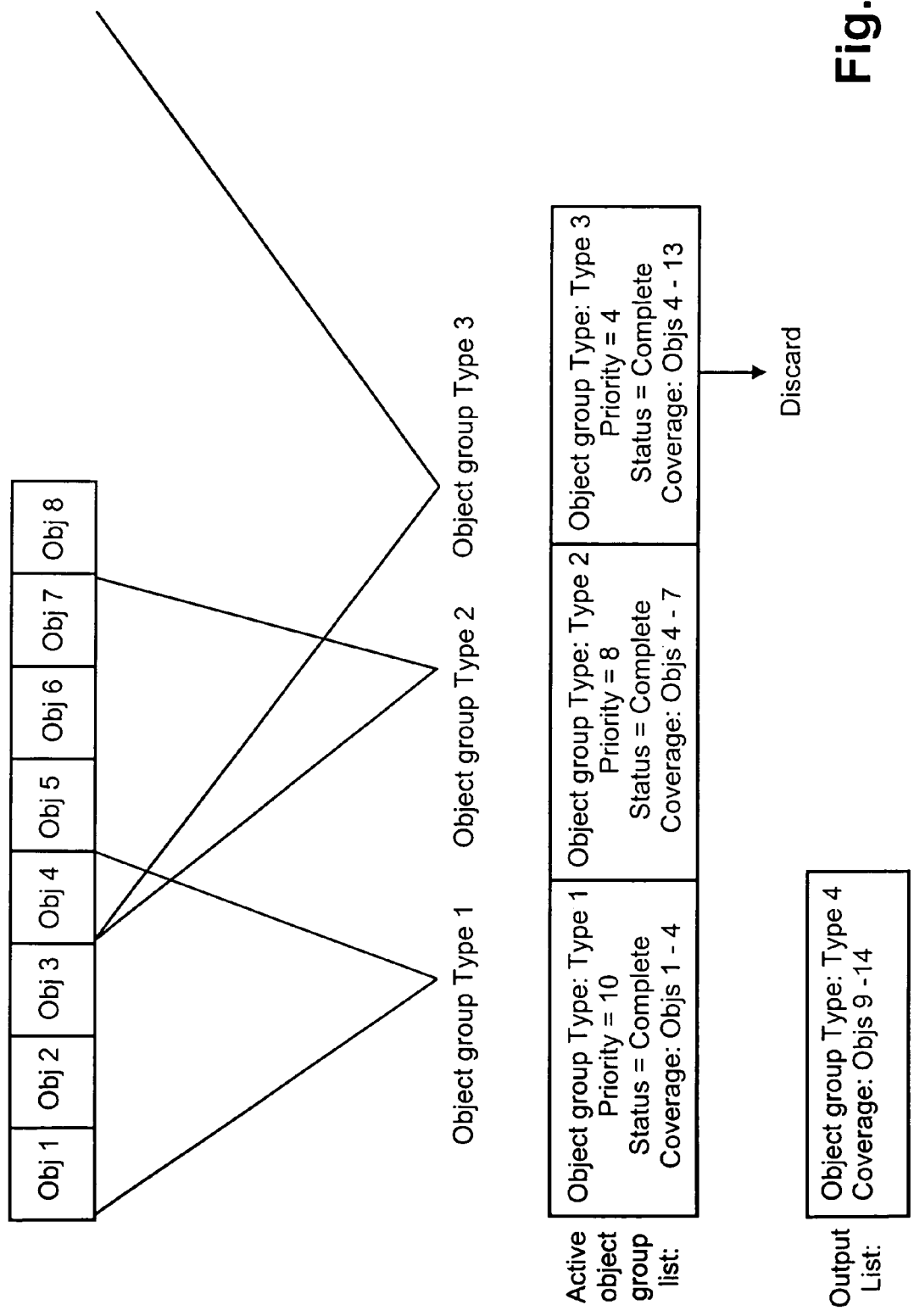

In step 528 the object group managing module 410 then scans the active list for object groups that had overlaps into object group type 4. As is illustrated in FIG. 7B, because object group type 3 overlapped object group type 4, and its 'Always Formed' flag was not set, object group 3 is discarded from the active object group list.

After discarding object group type 3 the object group managing module 410 then searches for the next highest completed object group within the active object group list. This happens to be object group type 2, with a priority of 8. Before this object group is put into the output list the object group managing module 410 checks to ensure there are no object gaps between this object group and the object group that was just placed into the output list.

Figure 7C:
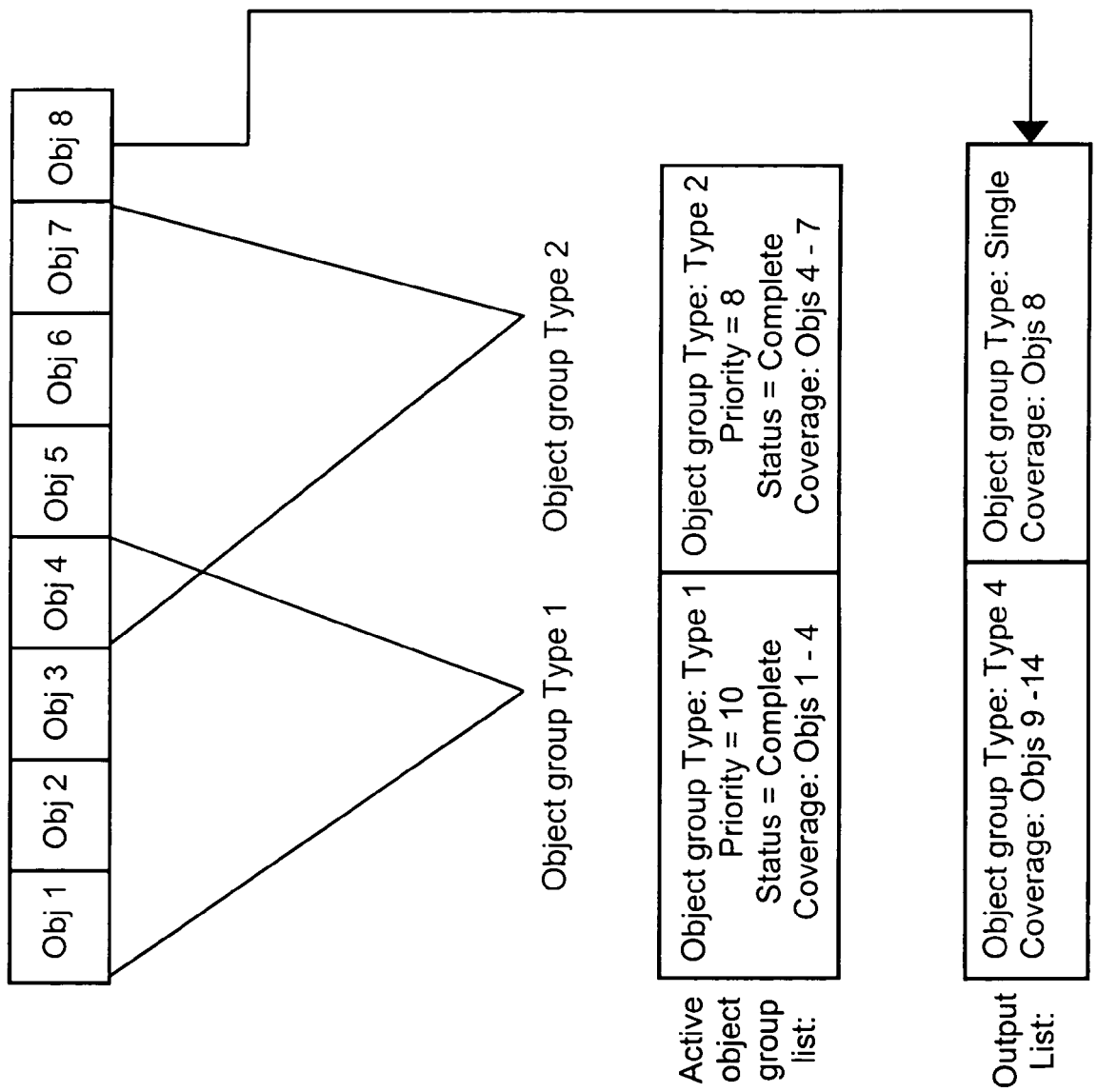

In the case where there is a gap, as is the case with object 8 as is illustrated in FIG. 7C, then that single object is placed into the output list before the next object group is transferred. For multiple single objects that are contiguous there only needs to be one entry inserted into the output list. This entry will contain the list of object numbers to be output singularly.

Figure 7D:
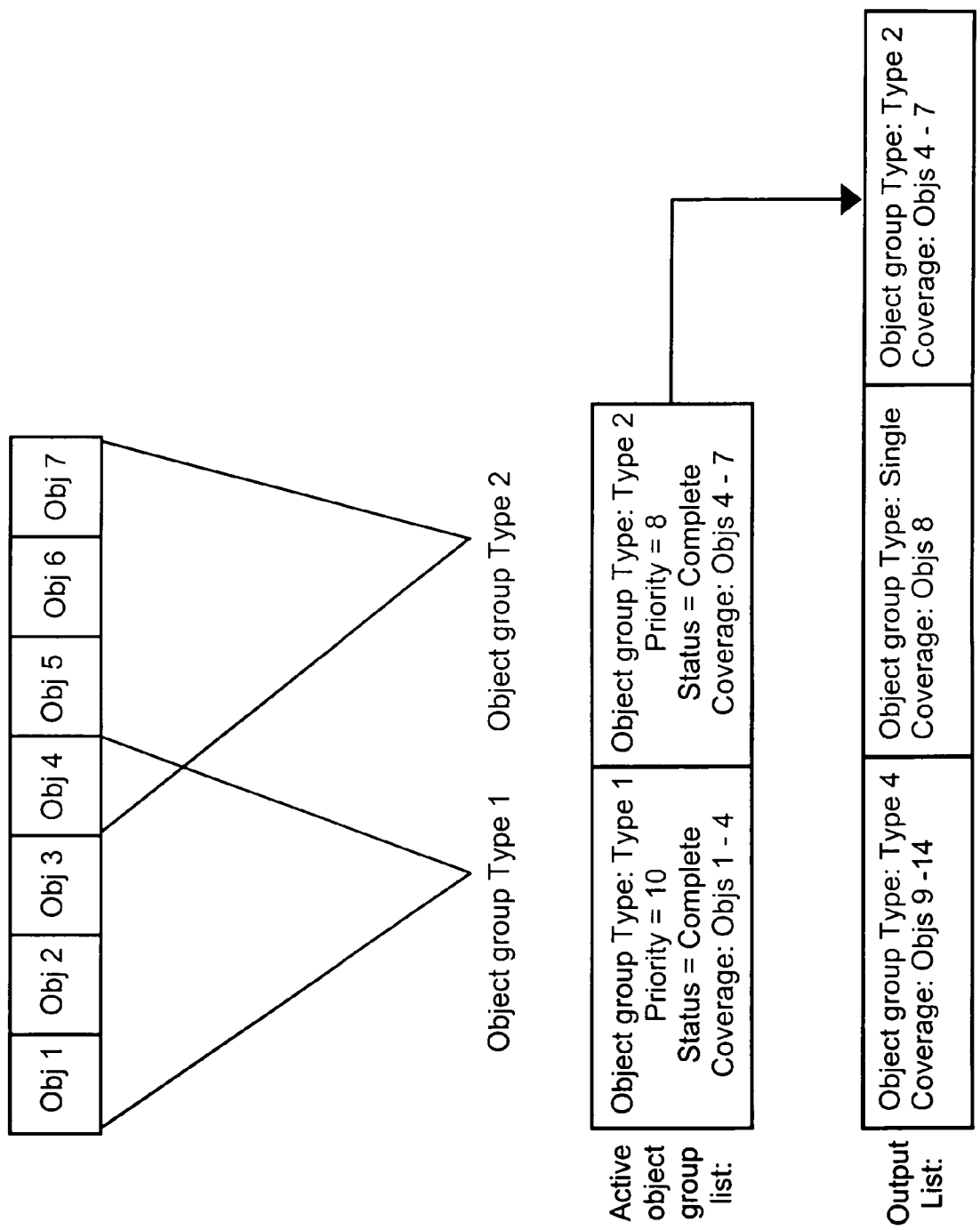
Figure 7E:
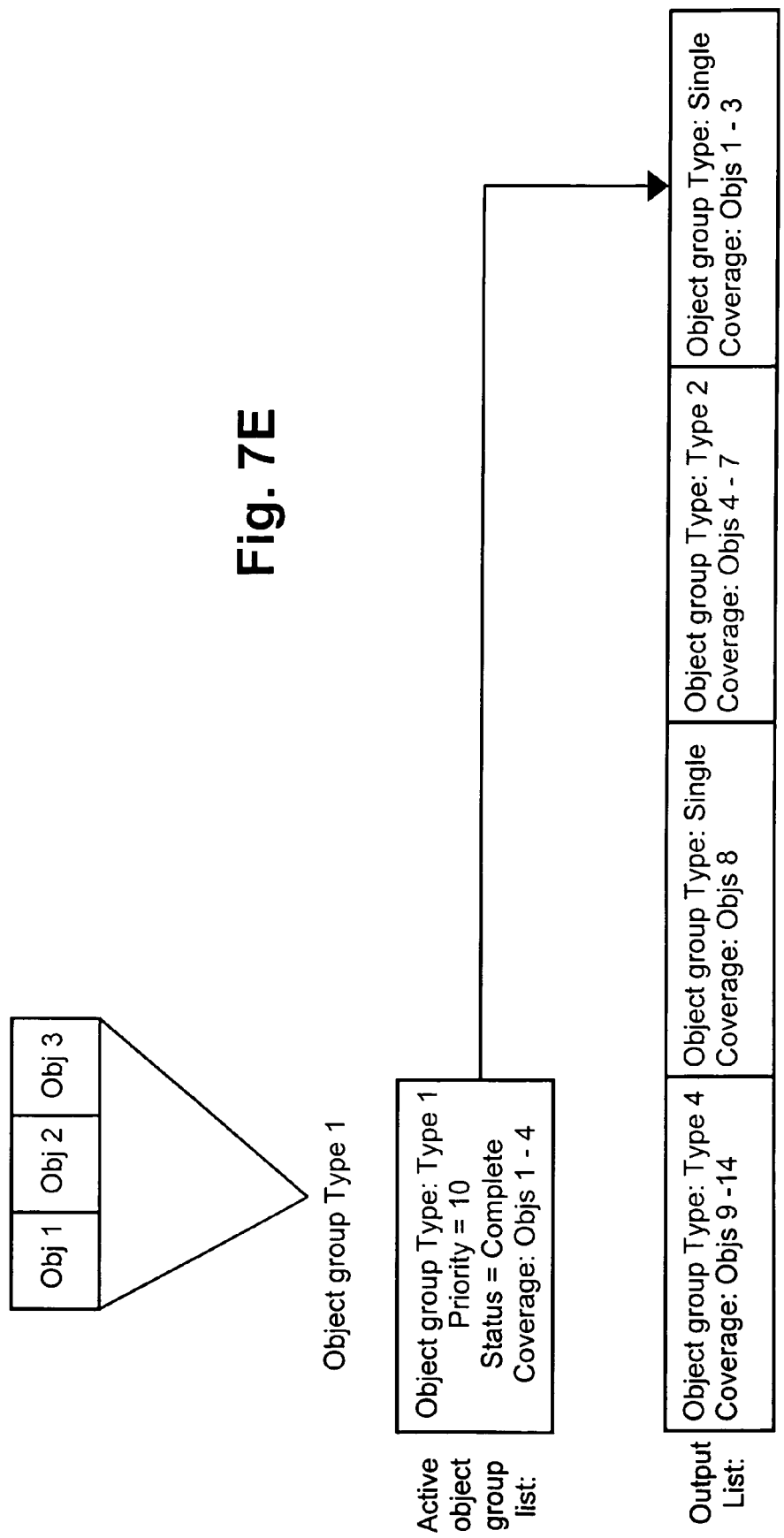

FIG. 7D shows the case where the data of the completed object group with the highest priority in the active object group list is transferred to the output list, which is object group type 2. Once object group type 2 covering objects 4 to 7 has been transferred to the output list, the active object group list is again scanned for non complete object groups. Referring to FIG. 7E, because the detection scheme associated with object group type 1 has its 'Always Formed' flag set, object 4 is removed from object group 1's object list. Object group type 1 covering objects 1 to 3 is then transferred to the output list.

Once all the objects have been moved into the output list, the object group managing module 410 starts to call the flush functions to output the object groups and single objects. When working with the output list the object group managing module 410 works from the last item in the list to the first item. This is because the last item in the list would have been the first objects to pass through the object group managing module 410 and hence the output list is a stack of output tasks. Working from the back of the output list the object group managing module 410 starts from object group type 1, followed by object group type 2, single object 8, and finally object group type 4. This concludes the example of FIGS. 7A to 7E.

From the above it can be seen that the graphics rendering system 400 has the advantage that new detection schemes may be introduced independent of existing detection schemes and without a growth in complexity in the communication within the graphics rendering system 400. In particular, the object group managing module 410 provides a basis for efficient implementation of priority based object group detection schemes without the need for complex inter-scheme communication through the management of graphic objects, detection schemes and their priorities.

INDUSTRIAL APPICABILITY

It is apparent from the above that the arrangements described are applicable to the computer graphics and printing industries.

The foregoing describes only some embodiments of the present invention, and modifications and/or changes can be made thereto without departing from the scope and spirit of the invention, the embodiments being illustrative and not restrictive.

I claim:

1. A method of forming object groups from a plurality of received objects, said method comprising for each received object the steps of:

passing data describing that received object to a plurality of detection schemes, each detection scheme having a priority and an associated object group type, and being operative to detect whether that received object forms part of an object group of its associated object group type;

receiving notification from at least one of the detection schemes as to whether that received object forms part of said object group of its associated object group type;

receiving notification from at least one of the detection schemes as to whether the object group of the associated object group type is completely formed upon inclusion of that received object in that object group, where at least partly formed object groups form a list; and outputting for rendering a completely formed object group based on the priorities.

2. The method as claimed in claim 1, wherein said outputting step outputs said completely formed object group if said completely formed object group is the object group in said list of a type associated with the detection scheme with a highest priority.

3. The method as claimed in claim 1, wherein said object is passed to detection schemes having associated object group types where said received object is a potential member of an object group of said associated object group types, and detection schemes having object groups in said list.

4. The method as claimed in claim 1 comprising the further step of outputting for rendering received objects not forming part of said object groups.

5. The method as claimed in claim 1 comprising the further step of outputting for rendering previously received objects that were forming part of one or more object groups that have not been output, where at least one of the objects of said completely formed object groups has been output.

6. The method as claimed in claim 5, wherein said previously received objects are output for rendering (i) individually or (ii) as a group, depending on an attribute of the detection scheme associated with the type of the object group of which said previously received objects form part.

7. A graphics rendering system for forming object groups from a plurality of received objects, said graphics rendering system comprising:

a plurality of detection schemes, each detection scheme having a priority and an associated object group type, and being operative to detect whether an object forms part of an object group of its said associated object group type; and a managing module for passing data describing a received object to a plurality of detection schemes; for receiving notification from at least one of the detection schemes as to whether that received object forms part of said object group of its associated object group type; for receiving notification from at least one of the detection schemes as to whether the object group of that associated object group type is completely formed upon inclusion of that received object in the object group, where at least partly formed object groups form a list; and for passing a completely formed object group to a rendering module based on the priorities.

8. The graphics rendering system as claimed in claim 7, wherein said managing module passes said completely formed object group to said rendering module if said completely formed object group is the object group in said list of a type associated with the detection scheme with a highest priority.

9. The graphics rendering system as claimed in claim 7, wherein said object is passed to detection schemes having associated object group types where said received object is a potential member of an object group of said associated object group types, and detection schemes having associated object groups in said list.

10. The graphics rendering system as claimed in claim 7 wherein said managing module further passes received objects not forming part of said object groups to said rendering module.

11. The graphics rendering system as claimed in claim 7 wherein said managing module further passes previously received objects to said rendering module, wherein said previously received objects were forming part of one or more object groups that have not been rendered, and at least one of the objects of said completely formed object groups has been rendered.

12. The graphics rendering system as claimed in claim 11, wherein said previously received objects are passed to said rendering module (i) individually or (ii) as a group, depending on an attribute of the detection scheme associated with the type of the object group of which said previously received objects form part.

13. A computer program product including a computer readable medium having recorded thereon a computer program for forming object groups from a plurality of received objects, said computer program comprising for each received object: code for passing data describing said received object to a plurality of detection schemes, each detection scheme having a priority and an associated object group type, and being operative to detect whether that received object forms part an object group of its associated object group type;

code for receiving notification from the at least one of the detection schemes as to whether the received object forms part of the object group of its associated object group type;

code for receiving notification from at least one of the detection schemes as to whether the associated object group of the associated object group type is completely formed upon inclusion of that received object in that object group, where at least partly formed object groups form a list; and code for outputting for rendering a completely formed object group based on the priorities.

14. The computer program product as claimed in claim 13, wherein said code for outputting outputs said completely formed object group if said completely formed object group is the object group in said list of a type associated with the detection scheme with a highest priority.

* * * * *

UNITED STATES PATENT AND TRADEMARK OFFICE
CERTIFICATE OF CORRECTION

| | | |
|---|---|---|
| PATENT NO. | : 7,274,379 B2 | Page 1 of 1 |
| APPLICATION NO. | : 10/807101 | |
| DATED | : September 25, 2007 | |
| INVENTOR(S) | : Ian Richard Beaumont | |

It is certified that error appears in the above-identified patent and that said Letters Patent is hereby corrected as shown below:

ON COVER PAGE [57] ABSTRACT:

Line 4, "an" should read --a--.

COLUMN 5:

Line 51, "423" should read --423,--.

COLUMN 14:

Line 35, "object: code" should read --object: ¶ code--.

Signed and Sealed this

Thirtieth Day of September, 2008

JON W. DUDAS
*Director of the United States Patent and Trademark Office*